Nov. 22, 1966     G. S. JONES ETAL     3,286,615
AUTOMATIC RESETTING EXPOSING MECHANISM
Filed Dec. 11, 1963
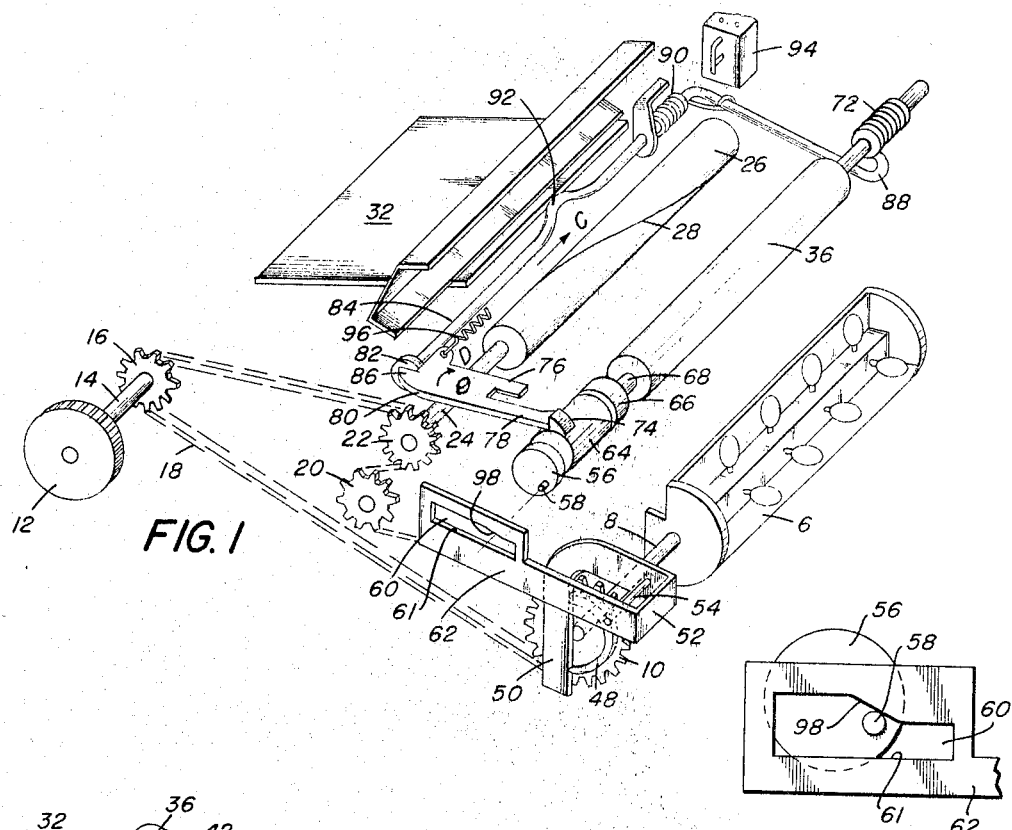
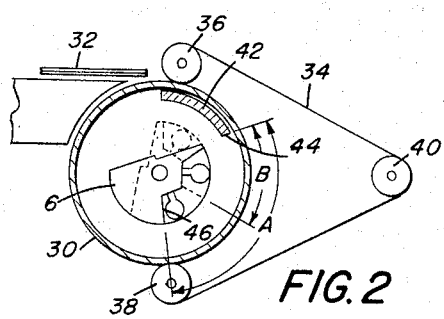
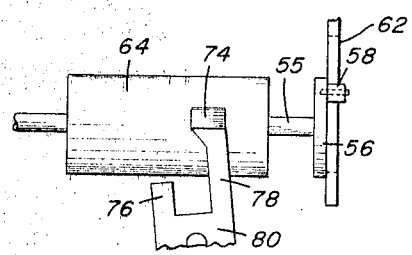
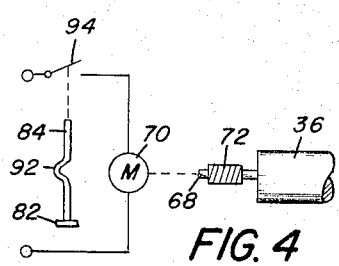
GEORGE S. JONES
ROBERT F. SMITH, JR
INVENTORS
BY
ATTORNEYS United States Patent Office 3,286,615
Patented Nov. 22, 1966

3,286,615
AUTOMATIC RESETTING EXPOSING MECHANISM
George S. Jones, Webster, and Robert F. Smith, Jr., Rochester, N.Y., assignors to Eastman Kodak Company, Rochester, N.Y., a corporation of New Jersey
Filed Dec. 11, 1963, Ser. No. 329,765
9 Claims. (Cl. 95—77.5)

This invention relates generally to photographic reproduction, and more specifically to an automatic resetting exposing mechanism for a photographic copying apparatus.

In a photographic copying process, it is necessary to place the original in face-to-face contact with a light-sensitive sheet and to expose the two to light. The desired exposure time depends upon the characteristics of the original—that is, its color, thickness, weight of paper, type of print, etc. In a copying apparatus of the type having a transparent exposure drum driven at a constant speed, the exposure time is normally varied by altering the size of the aperture through which the original and sensitized sheet are exposed. In such apparatus, there is usually one normal exposure, and hence one aperture opening that will result in the correct exposure for the greatest number of originals. A problem arises when the operator uses an original that requires an exposure that is different from the normal exposure and sets the aperture opening to achieve it. A subsequent operator using the machine may inadvertently expose his original at the previous setting, resulting in an unusable copy. To eliminate this problem, applicants exposure mechanism is provided with an automatic resetting mechanism which will automatically, at the conclusion of an exposure, reset the exposure mechanism to its normal position for achieving a normal exposure. The normal position and exposure time is initially established by test for each particular type of sensitized sheet.

Accordingly, one object of the present invention is to provide an automatic resetting mechanism for a sheet-exposing apparatus of the type having a member which is occasionally adjusted to alter the exposure given to the sheet, and which will automatically return the adjustable member to a predetermined normal position after each sheet-exposing operation.

Another object of the invention is to provide an improved adjustable exposure mechanism having an automatic resetting mechanism which will automatically reset the exposure mechanism to a normal position following an exposure.

Another object of this invention is to provide an improved exposure mechanism that is of simple design and construction, thoroughly reliable and efficient in operation, and economical to manufacture.

Another object of the invention is to provide an improved exposure mechanism having a slip clutch, and means for eliminating any clutch chatter that may develop in the clutch.

Objects and advantages other than those set forth above will be apparent from the following description when read in connection with the accompanying drawings, in which:

FIG. 1 is a perspective view, partly exploded, of one embodiment of an exposure mechanism constructed in accordance with the invention, and with parts thereof omitted for purposes of clarity;

FIG. 2 is a side elevation view in section of an exposure drum within which a rotatable light bank is mounted;

FIG. 3 is an enlarged, fragmentary, plan view of the latch disclosed in FIG. 1;

FIG. 4 is an electrical wiring diagram for the exposure mechanism including a diagrammatic showing of mechanical parts of the mechanism in working relationship therewith; and FIG. 5 is an enlarged segmental view in side elevation of a portion of the lamp bank resetting mechanism of FIG. 1.

With reference to the drawings, the exposure mechanism comprises a rotatable lamp bank 6 connected by a shaft 8 to a drive sprocket 10. The angular position of lamp bank 6 can be adjusted manually by turning a knob 12 which is drivingly connected to sprocket 10 by a shaft 14, sprocket 16, and a continuous sprocket chain 18 trained over the sprockets. The sprocket chain 18 is also trained over an idler sprocket 20, and another sprocket 22 secured to a shaft 24 of a cylindrical indicator 26. The indicator 26 has a helical scale 28 on its periphery which in conjunction with markings on a cover plate, not shown, indicates an exposure value.

It is, of course, well known in exposure mechanisms (see FIG. 2) to mount the rotatable lamp bank 6 within a transparent cylindrical drum 30 such as a glass drum, and to transport an original and light-sensitive sheet sandwich 32 around a portion of drum 30 for exposure by means of an endless belt 34 trained over a drive roller 36 and idler rollers 38, 40. In such mechanisms, particularly where drum 30 is driven at a constant speed, the accepted practice for varying the exposure time is to vary the circumferential portion of the drum that is illuminated and across which the original and sensitized sheet sandwich 32 is transported. In the present invention, this is accomplished by mounting a fixed opaque arcuate shield 42 within drum 30 adjacent its inner periphery, with one edge 44 of shield 42 defining one edge of the illuminated portion. The opposite edge of the illuminated portion is defined by the light reflective surface 46 of lamp bank 6 itself. Since bank 6 is rotatable, the illuminated portion of drum 30 is variable, thus varying the exposure time. For example, with lamp bank 6 in the full line position of FIG. 2, the illuminated portion of drum 30 extends over the arcuate length designated "A," whereas with lamp bank 6 in its dotted position, the illuminated portion extends over the arcuate length designated "B." It is, of course, obvious that the exposure time for the "A" setting would be approximately twice as long as for the normal "B" setting.

The lamp bank resetting mechanism comprises an arcuate lobe or projection 48 on sprocket 10 engageable by an arm 50 of a reset lever 52 pivoted on a shaft 54. Pivotal movement of reset lever 52 causes arm 50 thereof to engage the end of lobe 48 that is closest thereto, and to cam or turn lobe 48 and sprocket 10 about its axis to a normal position in which both of the ends of lobe 48 are in engagement with arm 50 of lever 52 as seen in FIG. 1. The lever 52 is movable by a disk 56 mounted on a shaft 55 (see FIG. 3), the disk 56 having a pin or roller 58 mounted eccentrically thereon which normally extends through a slot 60 in another arm 62 of reset lever 52, as best seen in FIGS. 3 and 5, and as shown in exploded relation to slot 60 in FIG. 1. A cylindrical member 64 is also secured to shaft 55 adjacent disk 56, and is coupled by a slip clutch 66 to a drive shaft 68 driven by any suitable motor 70 (see FIG. 4). The slip clutch 66 is not shown in detail since it may be of any well-known type designed to transmit a predetermined torque, and to slip if the torque is exceeded. The aforementioned drive roller 36 and a worm 72 are secured to shaft 68 for rotation therewith. The rotation of cylinder 64 and disk 56 through clutch 66 is controlled by a latch or escapement mechanism comprising a projection 74 on cylinder 64 cooperating with different length legs 76, 78 of a pivotally mounted bell crank 80 as seen best in FIG. 3. The bell crank 80 is pivotally moved by a trip mechanism actuated by the passage of the original and lightsensitive sheet sandwich 32 through the apparatus. A trip mechanism of this general type forms the subject of a copending U.S. patent application Serial No. 302,939, which has matured into U.S. Patent No. 3,242,279, and so will not be described in detail in this application. Suffice it to say that one end 82 of a trip lever 84 engages a shoulder 86 of bell crank 80, and the opposite end 88 of lever 84 is urged by a spring 90 into engagement with worm 72. Rotational movement of trip lever 84 caused by the leading edge of sandwich 32 striking a bowed portion 92 of lever 84 withdraws lever end 88 out of engagement with worm 72 allowing spring 90 to move trip lever 84 axially in the direction of the arrow designated "C". This action closes a switch 94 (see FIGS. 1 and 4) starting drive motor 70 of the copying apparatus, and allows a spring 96 to pivot bell crank 80 in the direction of the arrow designated "D", causing arm 78 thereof to release projection 74. The projection 74 is caught by arm 76 before cylinder 64 has had an opportunity to turn through more than a few degrees of rotation. This is sufficient to cause eccentric roller 58 to engage an inclined face 98 of slot 60, thus eliminating any possible chatter of clutch 66. As soon as sandwich 32 has cleared portion 92 of trip lever 84, the spring 90 re-engages lever end 88 with worm 72, and the rotation of drive shaft 68 and worm 72 axially moves trip lever 84 back to its original position. The bell crank 80 is pivoted by the end 82 of lever 84 in a direction opposite to arrow "B" causing arm 76 to release projection 74. The cylinder 64 and disk 56 are rotated through a single revolution, and stopped by projection 74 re-engaging arm 78. During this rotation, the eccentrically mounted roller 58 imparts a pivotal movement to reset lever 52 by virtue of the roller 58 and slot 60 connection, causing arm 50 to turn cam lobe 48 and sprocket 10, returning lamp bank 6 to its normal position.

In the operation of this device, let us assume that the operator moves lamp bank 6 by virtue of knob 12 from its normal position, as seen in full lines in FIG. 1 and dotted lines in FIG. 2, in which portion B of drum 30 is illuminated, to the maximum exposure position, as seen in full lines in FIG. 2, in which portion A of drum 30 is illuminated. This pivots lever 52 in a clockwise direction from its normal position as seen in FIGS. 1 and 5, causing the lower edge 61 of slot 60 to move toward roller or pin 58. During initial rotation of cylinder 64 and disk 56 following release of projection 74 by arm 78 and subsequent stopping of the projection by arm 76, pin 58 is moved into engagement with face 98 of slot 60, preventing clutch chatter as the sandwich 32 is transported around drum 30 for exposure. When arm 76 releases projection 74 following exposure, cylinder 64 and disk 56 continue their rotation until projection 74 reengages arm 78. During this movement, pin 58 engages edge 61, moving lever 52 to its normal position, which in turn moves lamp bank 6 to its normal position.

Although but one embodiment has been illustrated and described, it will be apparent to those skilled in the art that various changes and modifications may be made therein without departure from the spirit of the invention or from the scope of the appended claims.

We claim:

1. A photographic apparatus comprising an exposing station, means for transporting a light sensitive sheet through said exposing station, control means for selectively varying the exposure of said sheet at said station from a normal exposure, means for resetting said control means to provide said normal exposure, and means controlled by and correlated with movement of said sheet through said exposing station for operating said resetting means upon completion of other than said normal exposure of said sheet at said station for resetting said control means to provide a normal exposure.

2. A photographic apparatus comprising: an exposing station, means for transporting a light sensitive sheet through said exposing station for exposing said sheet, exposure control means including a member movable to and from a normal position to adjust the exposure of a sheet at said station in accordance with the position of said member, and resetting means operative when said member has been moved from said normal position for exposure of a given sheet, said resetting means being controlled by and correlated with movement of said sheet through said exposing station, to reset said member to said normal position following completion of the exposure of said sheet at said station.

3. The invention according to claim 2 wherein said resetting means comprises a projection on said member, first means operative to engage said projection and move said movable member to its normal position, drive means, and rotatable means driven by said drive means for operating said first means upon rotation of said rotatable means.

4. The invention according to claim 2 wherein said resetting means comprises an arcuately shaped projection on said member, first means comprising a first movable arm for engaging an end of said arcuate projection, and for moving said projection and adjustable member to its normal position in which both ends of said arcuate projection are in engagement with said first arm, drive means, and rotatable means driven by said drive means for operating said first means upon rotation of said rotatable means.

5. The invention according to claim 2 wherein said resetting means comprises a projection on said member, first means operative to engage said projection and to move said movable member to its normal position, said first means comprising a second pivotally movable arm having a slot therein, drive means, and rotatable means having an eccentrically mounted pin extending into said slot and being driven by said drive means for operating said first means upon rotation of said rotatable means.

6. The invention according to claim 2 wherein said resetting means comprises a projection on said member, first means operative to engage said projection and to move said movable member to its normal position, drive means, rotatable means driven by said drive means for operating said first means upon rotation of said rotatable means, an escapement mechanism for limiting the rotation of said rotatable means to one revolution, and tripping means responsive to said transported sheet for actuating said drive means and said escapement mechanism.

7. The invention according to claim 2 wherein said resetting means comprises a projection on said member, first means operative to engage said projection and to move said movable member to its normal position, drive means, rotatable means driven by said drive means for operating said first means upon rotation of said rotatable means, an escapement mechanism for limiting the rotation of said rotatable means to one revolution, said escapement mechanism comprising a lug carried by said rotatable means and a pivotally mounted bell crank having one end cooperating with said lug, and tripping means cooperating with said other end of said bell crank and being responsive to said transported sheet for actuating said drive means and said escapement mechanism.

8. The invention according to claim 2 wherein said resetting means comprises a projection on said member, first means operative to engage said projection and move said movable member to its normal position, drive means including a driven worm, rotatable means driven by said drive means for operating said first means upon rotation of said rotatable means, an escapement mechanism for limiting the rotation of said rotatable means to one revolution, said escapement mechanism comprising a lug carried by said rotatable means, and a pivotally mounted bell crank having one end cooperating with said lug, and tripping means responsive to said transported sheet for actuating said drive means and said escapement mechanism, said tripping means comprising an axially and angularly movable lever and a spring for angularly moving said lever into a normal position in which one part thereof is engageable with said worm, and another part is engageable with said other end of said bell crank, said lever further being movable by said spring in an axial direction for actuating said drive means and said escapement mechanism when said lever is engaged by a transported sheet and moved out of its normal position.

9. The invention according to claim 2 wherein said resetting means comprises a projection on said member, first means operative to engage said projection and move said movable member to its normal position, said first means comprising a pivotally movable arm having a slot therein with an inclined surface, drive means, rotatable means including an eccentrically mounted pin extending into said slot and driven by said drive means for operating said first means upon rotation of said rotatable means, and an escapement mechanism for said rotatable means, said escapement mechanism having means to permit rotatation of said rotatable means through a small angle causing said pin to engage said inclined surface for eliminating any clutch chatter.

References Cited by the Examiner
UNITED STATES PATENTS

| | | | |
|---|---|---|---|
| 2,918,857 | 12/1959 | Frantz | 95—77.5 |
| 3,031,941 | 5/1962 | Moser | 95—75 |
| 3,102,463 | 9/1963 | Biedermann et al. | 95—73 |

FOREIGN PATENTS 865,362    4/1961    Great Britain.

JULIA E. COINER, *Primary Examiner.*